US009252586B2

(12) United States Patent
Pratley

(10) Patent No.: US 9,252,586 B2
(45) Date of Patent: Feb. 2, 2016

(54) METHOD FOR FORMING A SEAL ON CONDUCTORS OF AN ELECTRICAL CABLE

(75) Inventor: Kimleigh George Montague Pratley, Krugersdorp (ZA)

(73) Assignee: Pratley Investments (Propietary) Limited, Krugersdorp (ZA)

( * ) Notice: Subject to any disclaimer, the term of this patent is extended or adjusted under 35 U.S.C. 154(b) by 698 days.

(21) Appl. No.: 12/514,817

(22) PCT Filed: Nov. 15, 2007

(86) PCT No.: PCT/IB2007/054655
§ 371 (c)(1),
(2), (4) Date: Jan. 20, 2010

(87) PCT Pub. No.: WO2008/059455
PCT Pub. Date: May 22, 2008

(65) Prior Publication Data
US 2010/0140877 A1    Jun. 10, 2010

(30) Foreign Application Priority Data

Nov. 15, 2006    (ZA) .................................. 2006/09508

(51) Int. Cl.
H01B 13/00    (2006.01)
H01B 17/34    (2006.01)
(Continued)

(52) U.S. Cl.
CPC ............. *H02G 15/046* (2013.01); *H02G 3/088* (2013.01); *B29C 65/483* (2013.01);
(Continued)

(58) Field of Classification Search
CPC ... H02G 15/00; H02G 15/003; H02G 15/013; H02G 15/02; H02G 15/04; H02G 15/043; H02G 15/046; H02G 15/06; H02G 15/076; H02G 15/20; H02G 15/22; H02G 15/23; H02G 1/14; H02G 1/145; H01B 7/17; H01B 7/28; H01B 7/282; H01B 7/285; H01B 7/288; B29K 2105/16; B29C 66/1122; B29C 66/5221; B29C 65/483; B29C 65/4865; B29C 65/527; F16L 5/02

USPC .......... 156/47, 48, 51, 52, 60, 62.2, 276, 293, 156/294, 296, 303.1, 305, 307.1, 307.3, 156/307.7, 331.2, 242, 245, 330; 277/312, 277/314, 316, 590, 602, 608, 609, 627
See application file for complete search history.

(56) References Cited

U.S. PATENT DOCUMENTS 4,353,623 A * 10/1982 Maier ........................... 359/253
4,461,736 A *  7/1984 Takagi ......................... 264/46.5
(Continued)

FOREIGN PATENT DOCUMENTS

EP    1170846 A1 *  1/2002  ........... H02G 15/068
GB    2138218 A  * 10/1984  ............... H02G 3/22
JP    01-228841 A  *  9/1989  ............. B32B 27/04

OTHER PUBLICATIONS

"Indicative Chemical Prices A-Z," ICIS Industries, taken from Aug. 28, 2006 issue of Chemical Market Reporter. http://www.icis.com/chemicals/channel-info-chemicals-a-z/.*
(Continued)

*Primary Examiner* — Philip Tucker
*Assistant Examiner* — Brian R Slawski
(74) *Attorney, Agent, or Firm* — Nelson Mullins Riley & Scarborough LLP; Anthony A. Laurentano

(57) ABSTRACT

The invention provides a method of forming a seal (62) between and around conductors (12A, 12B and 12C) of an electrical power cable (10), and has particular application as a safety measure in potentially explosive applications. The method includes passing the conductors (12A, 12B and 12C) through an opening in a body (26) so as to define a cavity within the body (26) between and around the conductors (12A, 12B and 12C); introducing an absorbent material (64) into the cavity; introducing a liquid settable material (66) into the cavity; and allowing the settable material (66) to be absorbed by the absorbent material (64) and to set thereby to seal the cavity between and around the conductors (12A, 12B and 12C).

17 Claims, 2 Drawing Sheets

(51) Int. Cl.
| | |
|---|---|
| *H01B 7/02* | (2006.01) |
| *H01B 13/06* | (2006.01) |
| *H01B 13/22* | (2006.01) |
| *B27N 3/00* | (2006.01) |
| *A61F 13/15* | (2006.01) |
| *D04H 13/00* | (2006.01) |
| *B29C 47/00* | (2006.01) |
| *B29C 65/00* | (2006.01) |
| *B32B 37/00* | (2006.01) |
| *F02F 1/06* | (2006.01) |
| *C09J 163/00* | (2006.01) |
| *C09J 4/00* | (2006.01) |
| *C09J 101/00* | (2006.01) |
| *C09J 201/00* | (2006.01) |
| *F16L 17/00* | (2006.01) |
| *F16L 21/02* | (2006.01) |
| *F16L 33/16* | (2006.01) |
| *H02G 15/013* | (2006.01) |
| *E04B 1/682* | (2006.01) |
| *F16J 15/08* | (2006.01) |
| *H02G 15/04* | (2006.01) |
| *H02G 3/08* | (2006.01) |
| *H02G 15/00* | (2006.01) |
| *F16L 5/02* | (2006.01) |
| *B29C 65/48* | (2006.01) |
| *B29C 65/52* | (2006.01) |

(52) U.S. Cl.
CPC .......... *B29C 65/4865* (2013.01); *B29C 65/527* (2013.01); *B29C 66/1122* (2013.01); *B29C 66/5221* (2013.01); *F16L 5/02* (2013.01); *H02G 15/003* (2013.01)

(56) References Cited

U.S. PATENT DOCUMENTS

| | | | |
|---|---|---|---|
| 4,758,454 A * | 7/1988 | Wood | 428/36.4 |
| 4,941,932 A | 7/1990 | John | |
| 6,459,074 B1 * | 10/2002 | Michelbach et al. | 219/541 |
| 2002/0066518 A1 | 6/2002 | Bukovnik et al. | |
| 2004/0069522 A1 * | 4/2004 | Jackson | 174/65 SS |
| 2006/0066162 A1 | 3/2006 | Woodson | |
| 2006/0196957 A1 * | 9/2006 | Johnson | 237/56 |

OTHER PUBLICATIONS

"Physical Properties of Selected Polymers," p. 13-4, CRC Handbook of Chemistry and Physics, 94$^{th}$ edition. CRC Press. http://www.hbcpnetbase.com/.*

Technical Data Sheet for ER2074 Epoxy Resin, Electrolube, 2005. http://datasheet.octopart.com/ER2074RP250G-Electrolube-datasheet-537902.pdf.*

International Search Report for Application No. PCT/IB07/54655, dated Mar. 17, 2009.

* cited by examiner

METHOD FOR FORMING A SEAL ON CONDUCTORS OF AN ELECTRICAL CABLE

RELATED APPLICATIONS

This application is a 35 U.S.C. 371 national stage filing of International Application No. PCT/IB2007/054655, filed 15 Nov. 2007, which claims priority to South African Patent Application No. 2006/09508 filed on 15 Nov. 2006 in South Africa. The contents of the aforementioned applications are hereby incorporated by reference.

BACKGROUND OF THE INVENTION

THIS invention relates to electrical power cables, and more specifically to a method of forming a seal between and around conductors of an electrical power cable particularly as a safety measure in potentially explosive applications. The invention also relates to a seal between and around conductors of an electrical power cable, and to a kit for forming such a seal.

Electrical power cables often are anchored to electrical apparatus with cable glands which prevent loads applied to the cable from being transferred to conductors inside the electrical apparatus. In some applications, for example in a flameproof (Ex d or E Ex d) apparatus, it is necessary to have a seal which retains the flameproof integrity of the apparatus. In other words, the seal must be capable, under explosion fault conditions, of preventing hot ignited material such as burning gas from escaping through the cable gland and/or through the cable itself.

Various different types of cable gland seals are known. For example, it is known to use an elastomeric sealing element in a cable gland seal for flameproof apparatus. Generally, these types of seals apply radial forces to the cable, and since the cable material is susceptible to plastic deformation and creep over time, these seals require careful design and have to be inspected periodically to ensure proper seal integrity. Also, since the insulated conductors of an electrical power cable do not always nest perfectly together, gaps between adjacent conductors can, in the event of an explosion inside the flameproof apparatus, form a path for hot gases and flames to exit the apparatus.

It is also known to form a seal in flameproof applications by introducing a settable compound between an inner surface of a cable gland and an outer sheath of an unarmoured cable or an inner sheath of an armoured cable. This type of seal does not apply radial forces to the cable and hence does not deform the cable sheath over time. However, these seals do not address the problem of gaps between adjacent, insulated conductors. In addition, these seals tend to be relatively difficult to inspect and, if the cable material is not compatible with the settable compound, proper adhesion between the seal and the cable may not be achieved.

Yet another known method of sealing a cable gland in flameproof applications is to cut back the outer insulation elements of the cable sufficiently to freely expose the individual, insulated conductors, to pass these conductors through a cable gland forming a cavity within the cable gland adjacent the conductors, and to place a settable compound into the cavity between and around the adjacent conductors. With this method, the compound typically is a two-part epoxy having a putty-type consistency which is pressed and kneaded into the cavity in the cable gland. Although this method can address problems associated with gaps between adjacent, insulated conductors and the application of radial forces to a cable, a major drawback is that the formation of a proper seal is relatively difficult and the quality of the seal is therefore dependent upon the expertise and dedication of the person mixing and placing the settable compound. Another drawback is that the settable compound does not always adhere well to the polymeric insulation material of the cable conductors.

It is an object of the present invention to provide a method of forming a seal on insulated conductors of an electrical power cable, particularly in flameproof applications, which is relatively easy to carry out, which is effective in sealing both between and around the insulated conductors, and which can form a proper seal with the polymeric material of the insulated conductors.

SUMMARY OF THE INVENTION

According to the invention there is provided a method of forming a seal between and around conductors of an electrical power cable, the method including:
  passing the conductors through an opening in a body so as to define a cavity within the body between and around the conductors;
  introducing an absorbent material into the cavity;
  introducing a liquid settable material into the cavity; and
  allowing the settable material to be absorbed by the absorbent material and to set thereby to seal the cavity between and around the conductors.

The body may be part of an electrical apparatus, or it may be integral or engageable with a cable entry device for electrical apparatus.

In one arrangement, the body is a component of or is engageable with a cable gland for attaching an electrical power cable to an electrical apparatus. For example, the body may be formed by a cable gland body or by an anchoring bush of a cable gland.

The anchoring bush may have a cylindrical inner surface which defines the opening through which the conductors of the electrical power cable pass. In this embodiment, the outer surface of the anchoring bush may include a first portion which is shaped to co-operate with an anchoring ring so as to anchor armour on the electrical cable between these components, and a second portion which is shaped to co-operate with an inner surface of a cable gland body.

The first portion of the anchoring bush outer surface may be tapered so as to co-operate with an inner tapered surface of a cone ring for anchoring the armour between the tapered surfaces, and the second portion of the anchoring bush outer surface may be circular cylindrical so as to be engageable with a circular cylindrical surface in the cable gland body.

Optionally, the second portion of the anchoring bush outer surface may be dimensioned to co-operate with the inner surface of the cable gland body so as to define a flame path between the anchoring bush and the cable gland body.

The outer surface of the anchoring bush may also define an annular recess for receiving a seal, for example an elastomeric O-ring, to prevent ingress of moisture and/or dust into the electrical apparatus. In this arrangement, the recess may be located between the first portion and the second portion of the anchoring bush outer surface.

In a further embodiment of the invention, the body may comprise a sleeve which is engageable with an anchoring bush of a cable gland and which is locatable within a cable gland body.

In this embodiment, the sleeve may be engageable with a seal within the cable gland body.

Alternatively, the sleeve may be engageable with an inner surface of the cable gland body so as to seal against this surface, in which case the sleeve may be arranged to engage the cable gland body by means of an interference fit, co-operating threads, or a combination thereof.

Typically, the sleeve is formed from a plastics material such as an elastomeric thermoplastic. In one particular embodiment, the sleeve is formed from an EPDM polypropylene co-polymer.

The absorbent material may be in the form of a powder, a granular material, a fibrous material, an open cell sponge, or a mixture or combination thereof.

Suitable absorbent materials include crushed expanded perlite, crushed natural zeolite, silica powder, table salt, polyethylene powder, sodium bicarbonate, and mixtures or combinations thereof.

Optionally, the absorbent material may include chemical agents which modify the surface tension of the absorbent material and/or the setting time of the settable material, and/or which assist the liquid settable and absorbent material combination in adhering to or thermally fusing with the polymeric material of insulation on the conductors of the electrical power cable.

In one embodiment, the absorbent material includes a polyethylene powder thermoplastic.

Preferably, the liquid settable material, when combined with the absorbent material, adheres to or fuses with the polymeric material of insulation on the conductors of the electrical power cable. For example, the settable material may, when combined with the absorbent material, produce exothermic heat when setting, temporarily softening the polymeric insulation and thermally fusing with this insulation.

The settable material may be introduced into the cavity as a single component.

Alternatively, the settable material may be introduced into the cavity as two or more components.

The settable material may be an acrylic-based compound, such as a cyanoacrylate-based compound, or a two-part epoxy which preferably has a low viscosity and a fast curing time.

A suitable settable material is ethylcyanoacrylate having a viscosity of about 2 MPa·s.

The invention extends to a kit for forming a seal according to the method described above, the kit including:
  an absorbent material which can be introduced into the cavity in the body between and around the conductors; and
  a liquid settable material which can be introduced into the absorbent material within the cavity and which can be absorbed by the absorbent material prior to setting, thereby to seal the cavity between and around the conductors.

The invention also extends to a seal between and around conductors of an electrical power cable formed in accordance with the method described above.

DESCRIPTION OF EMBODIMENTS

The present invention has application in the electrical field and is embodied in a method of forming a seal between and around conductors of an electrical power cable particularly as a safety measure in potentially explosive applications.

Figure 1:
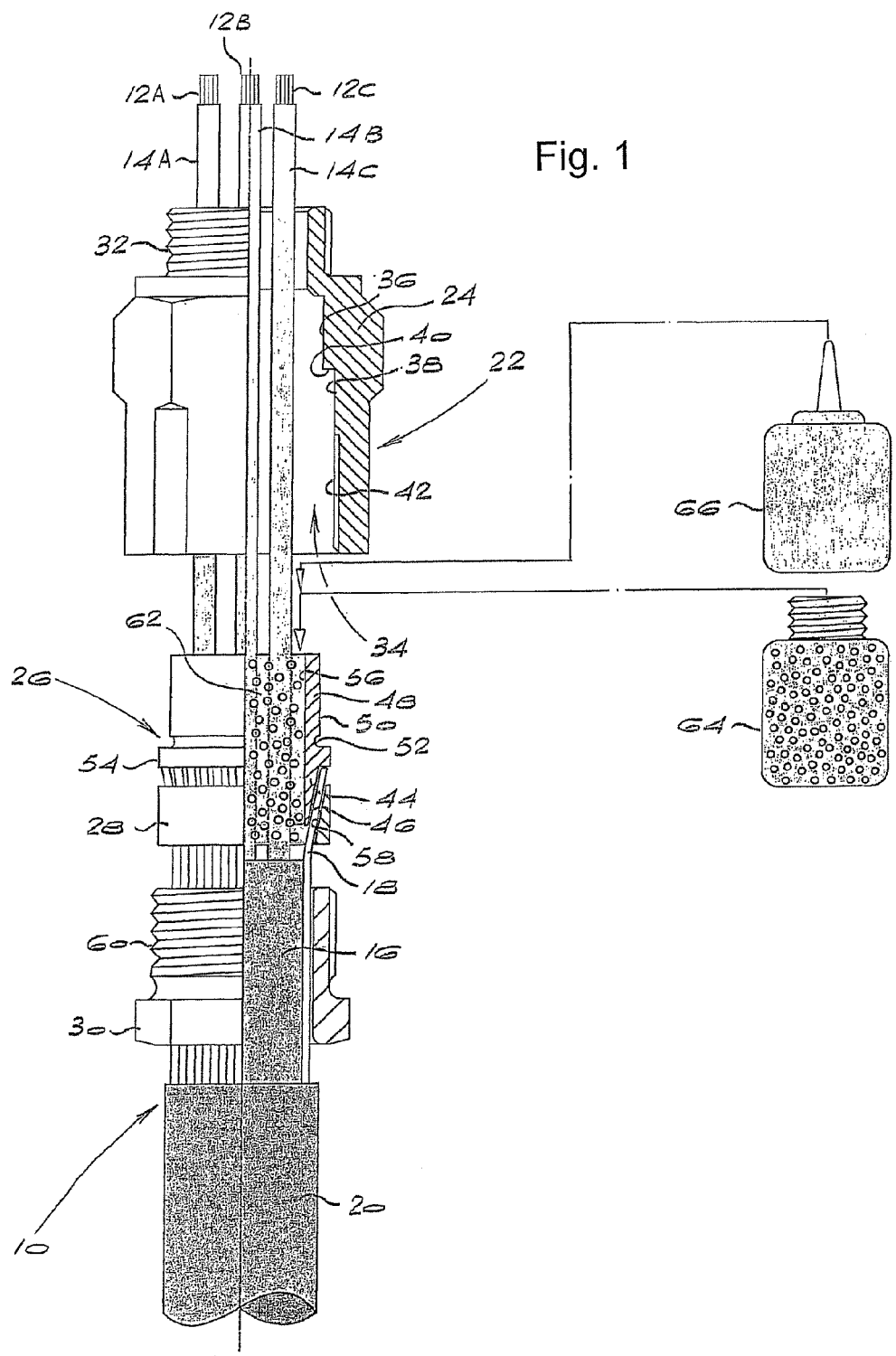
FIG. 1 shows, in partial cross-section, a side view of a seal formed on conductors of an electrical power cable in accordance with the method of the present invention.

FIG. 1 of the accompanying drawings illustrates an apparatus for forming a seal with a method according to one embodiment of the invention. In this embodiment, the electrical power cable is an armoured cable 10 having three conductors 12A, 12B and 12C within conventional polymeric insulation 14A, 14B and 14C. The insulated conductors are embedded within an inner sheath 16, and armour 18 extends between the inner sheath 16 and an outer sheath 20.

A cable gland designated generally with the reference numeral 22 includes a cable gland body 24, an anchoring bush 26, a cone ring 28 and a compression nut 30. In this embodiment of the invention, the gland body 24 includes a threaded nipple 32 for engaging a corresponding thread on the side wall of an opening in an electrical apparatus (not shown) such as a flameproof cable junction box or a flameproof enclosure. As can be seen, the gland body 24 defines a bore 34 which includes a first wall section 36, a second wall section 38 and a shoulder 40 between the first and second wall sections. An internal thread 42 runs along a portion of the second wall section 38, as shown.

The anchoring bush 26 has a first portion 44 which defines a tapered outer surface 46, and a second portion 48 which defines a circular cylindrical outer surface 50. The second portion 48 of the anchoring bush is sized to fit within the first wall section 36 of the cable gland bore so as to form a flame path between the cable gland body and the anchoring bush. A recess 52 retains an elastomeric O-ring (not illustrated) for preventing ingress of moisture and/or dust into the electrical apparatus, and adjacent the recess 52 is a flange 54 for engaging the O-ring. An inner, circular cylindrical wall 56 of the anchoring bush 26 defines an opening through which the conductors of the electrical power cable 10 pass.

As representatively illustrated in FIG. 1, the cone ring 28 includes a tapered inner surface 58 which is shaped to co-operate with the tapered outer surface 46 on the anchoring bush 26 to anchor the armour 18 on the electrical power cable 10 between the tapered surfaces of the anchoring bush and the cone ring.

The compression nut 30 is seen to include an external thread 60 which is arranged to co-operate with the internal thread 42 in the cable gland body 24 to secure these components together.

In use, the electrical power cable 10 may be stripped in the manner illustrated in FIG. 1, and the cable gland 22 may then be assembled as follows. The cable 10 may be inserted through the compression nut 30, the cone ring 28 and the anchoring bush 26, and the exposed armour 18 may be located between the tapered surfaces of the anchoring bush 26 and the cone ring 28. Thereafter, a seal may be formed within the anchoring bush 26 in a manner which is described in more detail below. Once the seal has been formed, the cable gland body 24 may be threaded into the opening in the electrical apparatus. Thereafter, the cable 10 may be inserted through the cable gland body 24, and the anchoring bush 26 and the cone ring 28 may be inserted into the cable gland body. The compression nut 30 and the cable gland body 24 may then be engaged by means of the co-operating threads 42 and 60. As the compression nut 30 approaches the end of the thread 42, it causes the O-ring on the anchoring bush 26 to be compressed between the shoulder 40 in the cable gland body 24 and the flange 54 on the anchoring bush. At the same time, the armour 18 is compressed between the cone ring 28 and the anchoring bush 26 so as to anchor the cable 10 to the cable gland 22.

In accordance with the method of the invention, a flameproof seal 62 may be formed around the insulated conductors of the electrical power cable 10 during the assembly of the cable gland 22. To form the seal 62, the conductors of the electrical cable 10 are passed through the anchoring bush 26, as shown, to form a cavity in the anchoring bush between and around the conductors. An absorbent material 64 is than inserted into the cavity, and a liquid settable material 66 is poured into the absorbent material within the cavity. Suitable absorbent materials include crushed expanded perlite, crushed natural zeolite, silica powder, table salt, polyethylene powder, sodium bicarbonate, and mixtures or combinations thereof. A suitable settable material is ethylcyanoacrylate having a viscosity of about 2 MPa·s. The settable material is absorbed by the absorbent material as it is poured into the cavity and subsequently sets to form a seal in the cavity between and around the conductors.

Figure 2:
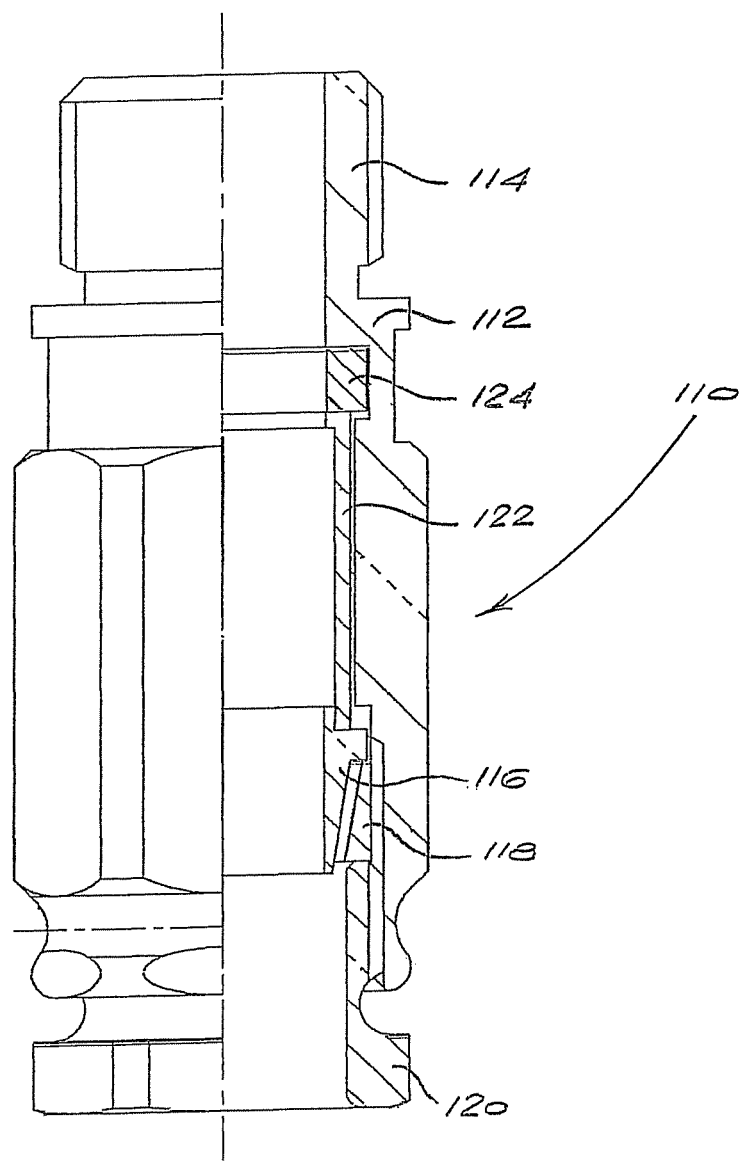
FIG. 2 shows, in partial cross-section, an apparatus for forming a seal on conductors of an electrical power cable in accordance with another embodiment of the invention.

FIG. 2 illustrates a cable gland 110 for forming a seal with a method according to another embodiment of the invention. In this case, the cable gland 110 includes a cable gland body 112 having a threaded nipple 114 for connecting the cable gland to an electrical apparatus (not shown). Similarly to the cable gland 22 illustrated in FIG. 1, the cable gland 110 includes an anchoring bush 116, a cone ring 118 and a compression nut 120. However, unlike the FIG. 1 cable gland, in this embodiment the cable gland 110 also includes a sleeve 122 which is engageable with the anchoring bush 116, and an elastomeric seal 124 which is engageable with both the sleeve 122 and an inner surface of the cable gland body 112. The sleeve 122 may be formed from a plastics material such as an EPDM polypropylene co-polymer or a HDPE.

The cable gland 110 may be connected to an electrical power cable (not illustrated) similar to the armoured cable 10 of FIG. 1 and, during assembly of the cable gland, a seal may be formed in accordance with the invention between and around conductors of the armoured cable extending through the sleeve 122. In this embodiment, the armoured cable may be passed through the compression nut 120, the cone ring 118, the anchoring bush 116 and the sleeve 122, and exposed armour on the armoured cable may be located between the tapered surfaces of the anchoring bush 116 and the cone ring 118. With the sleeve 122 and the anchoring bush 116 engaged, a seal may be formed in accordance with the invention by inserting an absorbent material into a cavity defined in the sleeve 122 between and around the conductors of the armoured cable, and subsequently pouring a settable material into the absorbent material within the cavity. The absorbent material may comprise a mixture of low density polyethylene and surface modified silica both in fine granular form, and the settable material may be ethylcyanoacrylate having a viscosity of about 2 MPa·s. As the settable material is poured into the absorbent material, it is absorbed by the absorbent material and subsequently sets to form a seal in the cavity between and around the conductors.

Once the seal has been formed, the cable gland body 112 may be threaded into an opening in an electrical apparatus, and the armoured cable may be inserted through the elastomeric seal 124 and the cable gland body 112. Thereafter, the sleeve 122, the anchoring bush 116 and the cone ring 118 may be inserted into the cable gland body 112 with the armour located between the tapered surfaces of the anchoring bush 116 and the cone ring 118, and the compression nut 120 may be threaded into the cable gland body 112. As the compression nut is inserted into the cable gland body, the seal 124 is compressed between the sleeve 122 and an inner surface of the cable gland body 112 and, at the same time, the armour is compressed between the anchoring bush 116 and the cone ring 118 to anchor the armoured cable to the cable gland 110.

In another, non-illustrated embodiment, a seal is formed in accordance with the present invention by passing an electrical power cable through a cable gland body, introducing an absorbent material directly into the bore of the cable gland body, and subsequently pouring a liquid settable material into the cable gland body so that it is absorbed by the absorbent material and sets to form a seal within the cable gland body between and around the conductors of the electrical cable. In this embodiment, a separate opening may be provided in the side wall of the cable gland body for introducing the absorbent material and the settable material.

Where the absorbent material is in the form of a powder, granules or fibres, it may be inserted into the cavity relatively easily, for example by pouring. Furthermore, with the absorbent material in the cavity, a convenient, low viscosity and easily pourable settable compound may be used without concern for containing the settable compound within the cavity. This makes the seal of the invention relatively easy to form without expert skills.

Also, the materials used to form the seal are relatively easy to insert both between and around conductors of an electrical power cable which facilitates the formation of an effective seal in flameproof applications.

Finally, by selecting suitable absorbent and settable materials, for example a settable material which produces exothermic heat when setting, a proper seal can be formed with the polymeric insulation on the conductors by, for example, thermal fusion.

The invention claimed is:

1. A method of forming a flameproof seal around and in between conductors of an electrical power cable as a safety measure in potentially explosive applications, the method comprising:
   passing the conductors through an opening in a body so as to define a cavity within the body around and in between the conductors;
   pouring an absorbent material into the cavity around and in between the conductors, wherein the absorbent material is in the form of a powder, a granular material, a fibrous material or a mixture or combination thereof;
   locating a liquid settable material in a container above the absorbent material and subsequently pouring the liquid settable material out of the container and into the absorbent material; and
   allowing the settable material to be absorbed by the absorbent material and to set thereby to seal the cavity around and in between the conductors,
   wherein the absorbent material and the liquid settable material are selected so that the seal formed on the conductors is capable, under explosive fault conditions, of preventing hot ignited material from escaping through the body around and/or in between the conductors of the electrical power cable.

2. A method according to claim 1, wherein the body is part of an electrical apparatus.

3. A method according to claim 1, wherein the body is integral or engageable with a cable entry device for an electrical apparatus.

4. A method according to claim 3, wherein the body is a component of or is engageable with a cable gland for attaching an electrical power cable to an electrical apparatus.

5. A method according to claim 4, wherein the body is formed by a cable gland body.

6. A method according to claim 4, wherein the body is formed by an anchoring bush of the cable gland.

7. A method according to claim 6, wherein the outer surface of the anchoring bush carries a seal for preventing ingress of moisture or dust into the electrical apparatus.

8. A method according to claim 1, wherein the body comprises a sleeve which is engageable with an anchoring bush of a cable gland and which is locatable within a cable gland body.

9. A method according to claim 8, wherein the sleeve is engageable with a seal within the cable gland body.

10. A method according to claim 8, wherein the sleeve is engageable with an inner surface of the cable gland body so as to seal against this surface.

11. A method according to claim 1, wherein the absorbent material includes chemical agents which modify the surface tension of the absorbent material or the setting time of the settable material, or which assist the liquid settable and absorbent material combination in adhering to or thermally fusing with a polymeric material of insulation on the conductors of the electrical power cable.

12. A method according to claim 1, wherein the liquid settable and absorbent material combination adheres to or thermally fuses with a polymeric material of insulation on the conductors of the electrical power cable.

13. A method according to claim 12, wherein the liquid settable and absorbent material combination produces exothermic heat when setting, which temporarily softens the polymeric insulation and allows for thermal fusion between the insulation and the liquid settable and absorbent material combination.

14. A method according to claim 1, wherein the liquid settable material is introduced into the cavity as a single component.

15. A method according to claim 1, wherein the liquid settable material is introduced into the cavity as two or more components.

16. A method according to claim 1, wherein the liquid settable material is an acrylic-based compound or a two-part epoxy having a low viscosity and a fast curing time.

17. A method according to claim 16, wherein the liquid settable material is a cyanoacrylate-based compound.

* * * * *